(12) United States Patent
Sanders et al.

(10) Patent No.: US 10,612,582 B2
(45) Date of Patent: Apr. 7, 2020

(54) TIE ROD AND METHOD FOR MANUFACTURING A TIE ROD

(71) Applicant: AIRBUS OPERATIONS GMBH, Hamburg (DE)

(72) Inventors: Inge Sanders, Hamburg (DE); Nabankele-Martial Somda, Hamburg (DE); Anna Wengorra, Hamburg (DE); Bastian Schaefer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/221,218

(22) Filed: Jul. 27, 2016

(65) Prior Publication Data
US 2017/0030399 A1    Feb. 2, 2017

(30) Foreign Application Priority Data
Jul. 29, 2015    (EP) ..................... 15178918

(51) Int. Cl.
*E04C 3/02*    (2006.01)
*F16C 7/02*    (2006.01)
(Continued)

(52) U.S. Cl.
CPC .............. *F16C 7/02* (2013.01); *B22F 3/1055* (2013.01); *B23K 26/0006* (2013.01); *B23K 26/342* (2015.10); *B29C 64/153* (2017.08); *B33Y 10/00* (2014.12); *B33Y 80/00* (2014.12); *B64C 1/06* (2013.01); *E04C 3/02* (2013.01); *B22F 2301/052* (2013.01); *B22F 2998/10* (2013.01); *B23K 2101/06* (2018.08);
(Continued)

(58) Field of Classification Search
CPC ..... E04C 3/02; E04C 3/04; E04C 3/30; E04C 3/32; E04C 3/36; E04C 2003/0408; E04C 2003/0413; E04C 2003/0439; E04C 2003/0443; E04C 2003/0447; E04C 5/0604; E04B 1/3205; E04B 1/34326; E04B 1/19; E04B 1/1909; E04B 1/1906; E04B 2001/1924; E04B 2001/2472
See application file for complete search history.

(56) References Cited

U.S. PATENT DOCUMENTS 387,118 A  *  7/1888  Stevens ..................... D21F 1/46
                                                     492/32
826,375 A  *  7/1906  Snowball ................. E04C 3/32
                                                     52/854
(Continued)

FOREIGN PATENT DOCUMENTS

CN    1464934 A    12/2003
EP    3124808 B1    2/2018

OTHER PUBLICATIONS

Extended European Search Report for EP 15 178 918.7 dated Feb. 2, 2016.
(Continued)

*Primary Examiner* — Jessica L Laux
(74) *Attorney, Agent, or Firm* — Jenkins, Wilson, Taylor & Hunt, P.A.

(57) ABSTRACT

A tie rod includes an elongate tie rod body of substantially uniform cross-section, the tie rod body comprising at least eight columns that run parallel to each other and are placed in a circumferential formation around a central axis of the tie rod.

9 Claims, 2 Drawing Sheets

(51) Int. Cl.
  *B64C 1/06* (2006.01)
  *B33Y 10/00* (2015.01)
  *B33Y 80/00* (2015.01)
  *B23K 26/342* (2014.01)
  *B23K 26/00* (2014.01)
  *B22F 3/105* (2006.01)
  *B29C 64/153* (2017.01)
  *B29K 307/04* (2006.01)
  *B29L 31/06* (2006.01)
  *B23K 101/06* (2006.01)
  *B23K 103/10* (2006.01)
  *B23K 103/16* (2006.01)
  *B23K 103/00* (2006.01)

(52) U.S. Cl.
  CPC ...... *B23K 2103/10* (2018.08); *B23K 2103/16* (2018.08); *B23K 2103/42* (2018.08); *B23K 2103/50* (2018.08); *B29K 2307/04* (2013.01); *B29L 2031/06* (2013.01); *F16C 2220/24* (2013.01); *F16C 2300/02* (2013.01)

(56) References Cited

U.S. PATENT DOCUMENTS

| | | | |
|---|---|---|---|
| 7,195,417 B2 | 3/2007 | Shiao et al. | |
| 8,313,600 B2 | 11/2012 | Wilson et al. | |
| 8,679,275 B2 | 3/2014 | Schalla et al. | |
| 2003/0136077 A1* | 7/2003 | Gregori | E04C 3/29 52/848 |
| 2003/0205021 A1* | 11/2003 | Ryan | E04C 3/30 52/834 |
| 2005/0115186 A1* | 6/2005 | Jensen | A45F 3/04 52/633 |
| 2006/0019759 A1* | 1/2006 | Shiao | F01D 5/066 464/182 |
| 2010/0054856 A1 | 3/2010 | Schalla et al. | |
| 2010/0236182 A1* | 9/2010 | Mackenzie | E04C 3/30 52/588.1 |
| 2011/0002743 A1* | 1/2011 | Fujii | D07B 5/00 405/231 |
| 2015/0113913 A1* | 4/2015 | Kim | E04C 3/34 52/834 |

OTHER PUBLICATIONS

Chinese Office Action for Chinese Application No. 201610608028.2 dated Jun. 20, 2018.

Chinese Office Action for Application No. 201610608028.2 dated Feb. 22, 2019.

\* cited by examiner

TIE ROD AND METHOD FOR MANUFACTURING A TIE ROD

CROSS-REFERENCE TO RELATED APPLICATION

This application claims priority to EP 15 178 918.7 filed Jul. 29, 2015, the entire disclosure of which is incorporated by reference herein.

TECHNICAL FIELD

The present disclosure relates to a tie rod and a method for manufacturing a tie rod, specifically for use in mechanical attachment system for aerospace, aeronautics, civil engineering and automotive industries.

BACKGROUND

Beams, joists and frames for construction work, for example in aeronautics, civil engineering or architecture, are designed to withstand bending forces acting perpendicular to the direction of extension of the respective beams. Conventional beams may be implemented as an integral part with flanges at the edges and a web spanning between the flanges. Alternatively, instead of a web, cutter milled struts may be implemented between parallel running longitudinal support bars, thus leading to decreased weight of the beam due to less material being used to form the beam. One example for a dandy roll employing longitudinal support rods encircled by stabilizing intermediate rings is shown in document U.S. Pat. No. 387,118 A.

To transmit greater tensile and compressive stress between different parts of a mechanical attachment system, rods or struts with an elongate body may be used that are provided with appropriate connectors on both ends to form attachment nodes for attaching the rods or struts to the main structures of the attachment system or, alternatively, amongst each other. In aerospace applications, so-called "tie rods" are usually used in order to provide support for any mechanical structure with the cabin, such as for example sanitary facilities, hat racks, overhead storage compartments, galley modules, ceiling components and similar structures. Such tie rods may be formed as a hollow cylinder made of lightweight metals such as aluminum, or composite materials such as carbon reinforced fibre plastics (CFRP) parts.

For aerospace industries, tie rods should be equally durable, yet lightweight. A large number of tie rods is conventionally used in civil or military grade aircraft so that even smaller weight reductions of a single tie rod will lead in sum to a considerable weight reduction for the whole aircraft. Composite members used to transmit tensile or compressive loads are known in which an open lattice structural shell is formed by interlacing longitudinal and helical filaments that form a truss-like grid. The longitudinal filaments primarily carry axial and bending loads, while the helical filaments both stabilize the longitudinal filaments and carry both torsion and transverse shear forces. Weight reduced tie rods are for example shown in document U.S. Pat. No. 8,679,275 B2 which discloses composite tie rods having an open lattice body formed of interlaced filaments. Document US 2005/0115186 A1 discloses a structural member having a plurality of helical components wrapped about an axis, each having straight segments connected end-to-end in a helical configuration. Document U.S. Pat. No. 8,313,600 B2 discloses three-dimensional geometric lattice support structures formed from composite materials.

SUMMARY

One of the ideas of the disclosure herein is, however, to provide solutions for further reducing the weight and structural complexity of tie rods that are able to withstand high tensile and compressive stress.

A first aspect of the disclosure pertains to a tie rod comprising an elongate tie rod body of substantially uniform cross-section. The tie rod body comprises at least eight columns that run or extend parallel to each other and are in a circumferential formation around a central axis of the tie rod.

According to a second aspect of the disclosure, a method for manufacturing a tie rod comprises arranging at least eight columns parallel to each other in a circumferential formation around a central axis, thereby forming an elongate tie rod body of substantially uniform cross-section.

An idea on which the present disclosure is based is to build up a tie rod from a minimum of eight columns which are placed in an approximately circle formation. Those columns may be broken down by several circular rings to avoid buckling of the columns before the ultimate compression strength of the material is reached. The formation of the tie rod from columns instead of a hollow cylinder as with conventional tie rods allows for weight savings of up to 40% while for compression loadcases the resistance to buckling of such a tie rod is maintained.

The trussed tie rods of the disclosure herein do not need any diagonally running or sloped rafters that interconnect neighboring columns. The columns themselves act as truss members or chords running or extending parallel to the direction of extension of the trussed tie rods—the tensile and compressive stability is guaranteed by virtue of the number, spacing and circumferential constellation of the columns around the perimeter of the tie rod truss. To optional cross-pieces that may encircle the lateral surface of the trussed tie rod body may act as additional support members to increase the resistance to buckling of the columns under excessive compressive loads.

Particularly advantageous may additionally be the reduction of costs, weight, lead time, part count and manufacturing complexity coming along with employing any kind of layer manufacturing technology when manufacturing a tie rod in the above mentioned manner.

According to an embodiment of the tie rod, the elongate tie rod body may be of substantially cylindrical shape. According to further embodiments of the tie rod, the tie rod body may comprise exactly eight columns, or alternatively may comprise or consist of the at least eight columns. Eight columns are an advantageous compromise between weight efficiency and maintaining the ability of the tie rod to reduce bending loads on the tie rod.

According to an embodiment of the tie rod the columns may have approximately equal cylindrical shape. Cylindrical shapes advantageously provide for about equal moments of inertia in two perpendicular directions of extension of the columns, thereby exhibiting an optimum ratio between buckling resistance and weight.

In this embodiment, the ratio between the radius of the columns and the diameter of the tie rod body equals to about 0.28. This ratio is advantageous since for the specified value eight columns arranged in a circumferential geometry around a central axis are wide enough to have their lateral surfaces contact each other. With the columns contacting each other, they will provide lateral support to each other, thereby obviating the need for circular support rings; the columns themselves provide enough lateral support in order to suppress buckling of the tie rod under compressive stress.

According to an embodiment of the tie rod, the tie rod body may further comprise one or more cross-pieces which are encircling the lateral surface of the tie rod body. In one embodiment, those cross-pieces may connect to each of the at least eight columns at interconnection nodes at approximately the same height of the tie rod body.

According to an embodiment of the tie rod, the cross-pieces may have the shape of ring toruses. The tie rod body may comprise at least three cross-pieces, which are spaced out approximately equidistantly among each other over the direction of extension of the tie rod.

According to an embodiment of the tie rod, the threshold buckling strength of the tie rod may exceed or be equal to the ultimate stress capability of the material used for manufacturing the at least eight columns.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Figure 1:
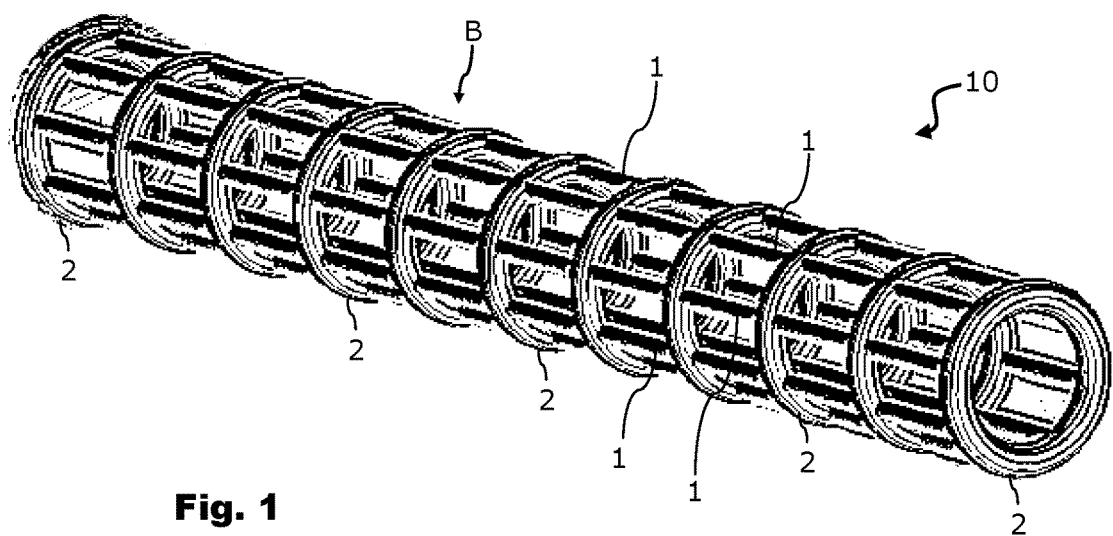
FIG. 1 schematically illustrates a perspective view of a tie rod according to an embodiment of the disclosure herein.
Figure 2:
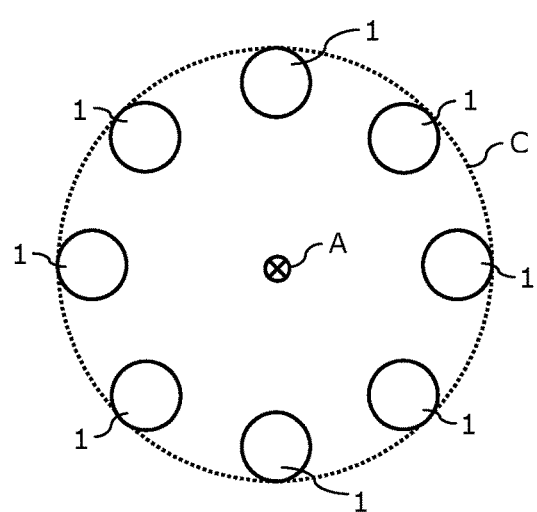
FIG. 2 schematically illustrates a cross-sectional view of a tie rod according to another embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Some of the components, elements and assemblies as disclosed hereinforth may be fabricated using free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and/or additive layer manufacturing (AM). Those techniques belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

3D or AM techniques may be used in procedures for building up three-dimensional solid objects based on digital model data. 3D/AM employs an additive process where layers of material are sequentially built up in different shapes. 3D/AM is currently used for prototyping and distributed manufacturing with multiple applications in engineering, construction, industrial design, automotive industries and aerospace industries.

FIG. 1 shows a schematic illustration of a tie rod 10. The tie rod 10 may be built up from at least eight columns 1 that are disposed and run parallel to each other and disposed or placed in a circumferential formation around a central, particularly central rotational, axis A of the tie rod 10. The at least eight columns 1 together form an elongate, substantially prismatic body B, i.e. a prismatic body B with substantially uniform cross-section. For example, the prismatic body B may have a substantially cylindrical shape, as depicted in FIG.

The tie rod 10 may further comprise one or more cross-pieces 2 which are encircling the lateral surface of the elongate, substantially prismatic body B. The cross-pieces 2 may connect to each of the at least eight columns 1 at interconnection nodes at approximately the same height of the elongate, substantially prismatic body B. For example, as depicted in FIG. 1, the cross-pieces 2 may be ring toruses. The number of cross-pieces 2 is generally not limited and they may be spaced out equidistantly among each other over the direction of extension of the tie rod 10. For example, the number of cross-pieces 2 may be at least three. The cross-pieces 2 may prevent the columns 1 from buckling when the tie rod 10 is under compression.

The tie rod 10 is able to sustain almost the same load in tension as in compression. This is due to the fact that the threshold buckling strength exceeds ultimate stress capability of the material used for manufacturing the columns 1 and the cross-pieces 2. The general structural arrangement of columns 1 and cross-pieces 2 follows a biomimetic approach following the natural model of bamboo rods. The number of eight columns 1 is needed in order to reduce bending loads in the cross-pieces 2, and thus to reduce the weight of the cross-pieces 2. It may, however, be possible to use more than eight columns 1 without substantial loss in weight efficiency due to the variation is radius of the columns 1.

The columns 1 are generally shown as being cylindrical as well, however, elliptical cross-sections or approximately elliptical cross-sections may also be used for the formation of the columns 1. For the columns 1 themselves, in principle any suitable shape with two moments of inertia being similar to each other may be used without substantial loss in weight efficiency.

The positioning and spacing of the cross-pieces 2 may depend on the buckling length of the columns 1 that is needed to reach the ultimate compression strength of the material of the columns 1. The material capability is in this case more efficiently used during compression so that a weight saving potential of more than 40% may be possible.

In order for the tie rod 10 to efficiently sustain bending loads, additional columns 1 may be integrated. Additionally or alternatively, other circumferential shapes for the cross-pieces 2 may be used, for example rectangular toroidal shapes, cuboid shapes or polygonal shapes. The appropriate shape may be chosen depending on the required increase in the moment of inertia in the required direction.

It may also be possible to obviate the need for cross-pieces 2, if the columns 1 are placed with their lateral surfaces contacting neighboring columns 1. In that case, the cross-pieces 2 which originally were supposed to suppress buckling are not required since the columns 1 provide lateral support to each other by virtue of their contact or overlap. By refraining from using cross-pieces 2, further weight efficiency might be gained.

Figure 3:
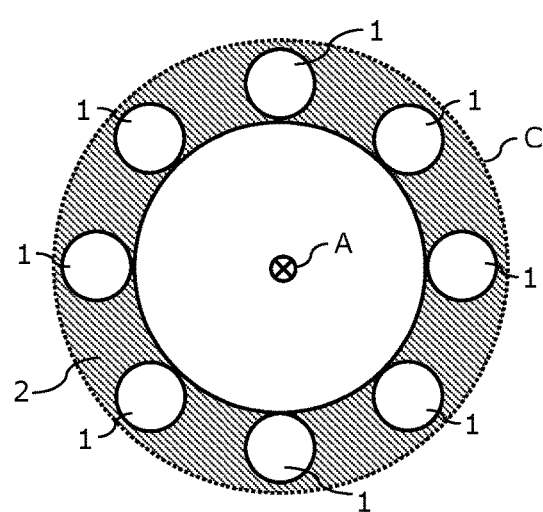
FIG. 3 schematically illustrates a cross-sectional view of the tie rod of FIG. 1 according to another embodiment of the disclosure herein.
Figure 4:
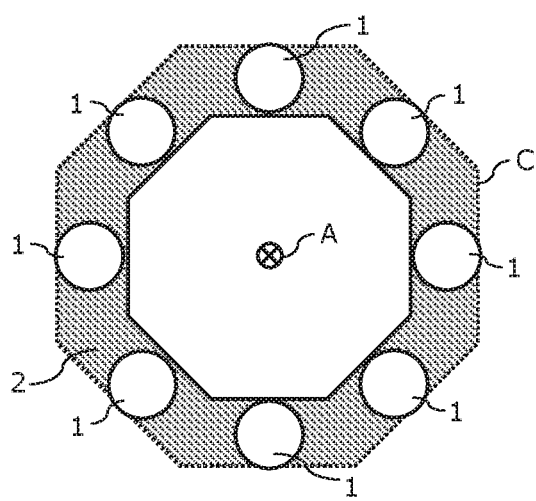
FIG. 4 schematically illustrates a cross-sectional view of a tie rod according to another embodiment of the disclosure herein.

FIGS. 2 through 6 schematically illustrate cross-sectional views of tie rods 10 according to modified configurations. Specifically, FIG. 3 illustrates a cross-section of a tie rod 10 according to FIG. 1 with eight columns 1 spaced equidistantly and symmetrically around a central body axis in a circular arrangement along a lateral surface C of the body B. The eight columns 1 are interconnected by generally perpendicularly running or extending support cross-pieces 2. The cross-pieces 2 are generally encircling the lateral surface C of the tie rod body B. While the may be omitted entirely—as in the example shown in FIG. 2, they may take on various outer three-dimensional shapes such as for example ring toruses as in the example of FIG. 3 or octagonal toroids as in the example of FIG. 4.

The cross-pieces 2 connect to each of the at least eight columns 1 at interconnection nodes. Those interconnection nodes may be at approximately the same height of the tie rod body B for one of the cross-pieces 2 with respect to the length of the tie rod 10. The number of cross-pieces 2 is generally not limited. For example, a suitable number of cross-pieces 2 may be at least three for a relatively short tie rod 1. With increasing length of the tie rod body B, the number of cross-pieces 2 may in particular be larger than three. The cross-pieces 2 may be distributed equidistantly along the direction of extension of the tie rod 10 so that webbing panels of approximately equal area are formed between each two neighboring columns 1 and neighboring cross-pieces 2. The approximately equal distribution of webbing panel surface area helps to optimize the ratio between weight of the tie rod 10 and resistance to buckling under compressive loads.

Figure 5:
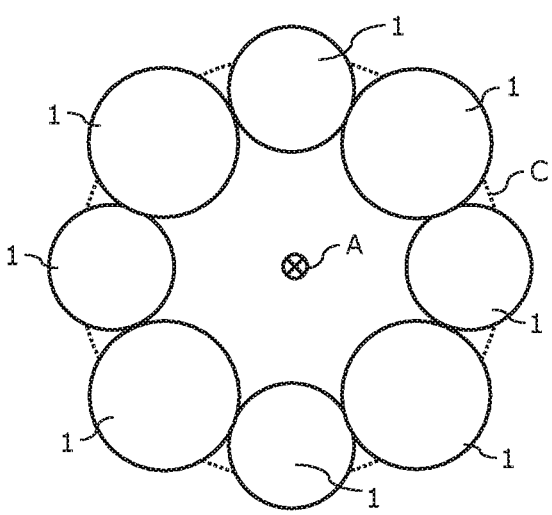
FIG. 5 schematically illustrates a cross-sectional view of a tie rod according to another embodiment of the disclosure herein.
Figure 6:
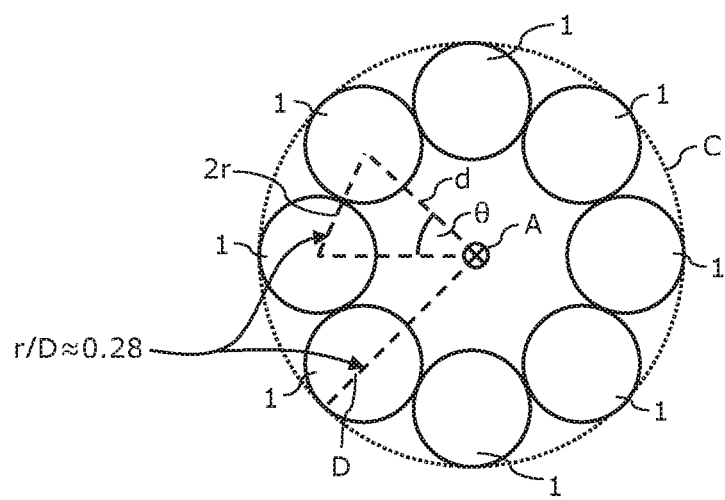
FIG. 6 schematically illustrates a cross-sectional view of a tie rod according to another embodiment of the disclosure herein.

FIGS. 5 and 6 show columns 1 of larger radius, the lateral surfaces of which are contacting lateral surfaces of neighboring columns. In FIG. 5, the radius of neighboring columns 1 may vary so that the space between the columns is efficiently filled up. Once the columns 1, based on the need, come to contact to each other with an appropriate overlap (for example to about 12.5% of the diameter of the columns 1), the cross-pieces are not necessarily required any more to avoid buckling; the lateral support of the columns 1 provided to each other already increases the resistance to buckling of the tie rod under compression. By being able to omit the cross-pieces, further weight benefits may be achieved. While an overlap value of 12.5% is given as an example, lower overlap percentages may be chosen as well, depending on the material and dimensions of the columns.

Specifically in the exemplary arrangement of FIG. 6, the tie rod body B may be formed with exactly eight columns 1 of cylindrical shape and approximately equal radius. The column arrangement angle θ is then about 45°. The distance between the centres of two neighbouring columns 1 is double the radius r of a single column and the columns 1 are offset from the central tie rod axis A by an offset value d. In this arrangement, the ratio between the radius r and the offset value d is $$r/d=(0.5\cdot(1-0.5^{-0.5}))^{0.5}\approx 0.38.$$

Therefore, the ratio of the radius r of the columns and the diameter D=d+r of the whole tie rod body B is $$r/D=r/(d+r)\approx 0.28.$$

With ratio r/D being chosen to be at least 0.28, an optimum weight efficiency of the resulting tie rod with respect to stability, buckling resistance and tensile strength may be achieved, when an certain additional overlap between the columns is accounted for. This additional overlap guarantees sufficient lateral contact area between the columns.

The tie rods as disclosed hereinforth may be used in a lot of applications, including—but not limited to—constructions of frames, stringers and crossbeams in aircraft, interior design, bridge building, vehicle carriages, civil engineering, applications for children's toys and similar. A particular application pertains to the construction of frameworks in aircraft. Such frameworks include tie rods for bracing a fuselage structure of an aircraft, structurally reinforcing a fuselage structure and/or for fastening a component on the fuselage structure. Those tie rods are often referred to as "Samer rods" or "Samer-type rods" and generally have a central strut portion corresponding to the elongate, substantially prismatic body B between two end portions used to interconnect the tie rod between two joints or brackets. The tie rods in a framework structure may be used as tension, compression and/or bending members.

Samer rods generally have a central portion between two end regions that may be formed according to the tie rod bodies B as described and explained in this application. The end regions may have a shank and eyes arranged at shank ends on both sides for connecting the Samer rod to the fuselage structure. In order to link the Samer rod to the structure of the aircraft, a clamp or a forked bracket is attached to the structure. The clamp (or bracket) has a bore which may align with the eye of a shank end so that a bolt introduced through the bore and the eye pivotably couples the Samer rod to the clamp (or bracket).

A particular advantage of the tie rods as disclosed, and in particular of the tie rod 10, is the possibility to manufacture all parts using a 3D printing or an Additive Manufacturing (AM) technique. Particularly the tie rods 10 may be 3D printed with the body B, the shank and the eyes already manufactured seamlessly. This leads to an advantageous mechanical stability of the tie rod 10.

Figure 7:
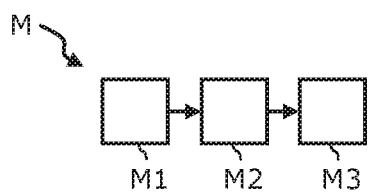
FIG. 7 schematically illustrates stages of a method for manufacturing a tie rod according to yet another embodiment of the disclosure herein.

FIG. 7 schematically illustrates stages of a method M for manufacturing a tie rod, such as a tie rod 10 as described in conjunction with FIGS. 1 through 6. In a first step M1, the method M comprises arranging at least eight columns 1 parallel to each other in a circumferential formation around a central axis A, thereby forming an elongate tie rod body B of substantially uniform cross-section. Moreover, the method M may include in optional additional steps M2 and M3 a formation of one or more cross-pieces 2 which are encircling the lateral surface of the tie rod body B, and an interconnection of the cross-pieces 2 to each of the at least eight columns 1 at interconnection nodes at approximately the same height of the tie rod body B.

The manufacturing method M may particularly be implemented by using an Additive Manufacturing, AM, process, such as for example Fused Deposition Modelling, FDM, Additive Layer Manufacturing, ALM, Selective Laser Melting, SLM, or Selective Laser Sintering, SLS.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tie rod configured to transmit tensile and compressive stress between parts of a mechanical attachment system, comprising:
   at least eight columns that are disposed parallel to each other, wherein a center of each of the at least eight columns is spaced equidistantly and symmetrically in a circular formation around a central body axis within an open central area,
   wherein the columns are elongate and comprise a substantially cylindrical cross-sectional shape,
   wherein lateral surfaces of each of the columns contact lateral surfaces of neighboring columns without additional lateral support.

2. The tie rod of claim 1, wherein an overall shape of the tie rod is substantially cylindrical.

3. The tie rod of claim 1, wherein the tie rod consists of exactly the eight columns.

4. The tie rod of claim 3, wherein the columns have approximately equal cylindrical shape, and a ratio between a radius of the columns and an overall diameter of the tie rod equals to about 0.28 in order to guarantee sufficient lateral contact area between the columns to omit cross-pieces.

5. The tie rod of claim 3, wherein the columns have approximately equal cylindrical shape, and a ratio between a radius of the columns and an overall diameter of the tie rod is at least 0.28 in order to guarantee sufficient lateral contact area between the columns to omit cross-pieces.

6. The tie rod of claim 1, wherein a threshold buckling strength of the tie rod exceeds or is equal to the ultimate stress capability of a material used for manufacturing the at least eight columns.

7. The tie rod of claim 1, wherein the neighboring columns contact each other with an overlap.

8. The tie rod of claim 7, wherein the overlap equals to about 12.5% of a diameter of the columns.

9. The tie rod of claim 1, wherein the columns have approximately equal cylindrical shape, and wherein each of the columns is spaced from the central body axis by an equivalent distance.

\* \* \* \* \*